(12) United States Patent
Kravitz et al.

(10) Patent No.: US 10,810,011 B2
(45) Date of Patent: Oct. 20, 2020

(54) IMPLEMENTING 128-BIT SIMD OPERATIONS ON A 64-BIT DATAPATH

(71) Applicant: CAVIUM, LLC, San Jose, CA (US)

(72) Inventors: David Kravitz, Cambridge, MA (US); Manan Salvi, Newton, MA (US); David A. Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 323 days.

(21) Appl. No.: 14/940,585

(22) Filed: Nov. 13, 2015

(65) Prior Publication Data

US 2016/0140079 A1    May 19, 2016

Related U.S. Application Data

(60) Provisional application No. 62/079,881, filed on Nov. 14, 2014.

(51) Int. Cl.
*G06F 9/30* (2018.01)
*G06F 9/38* (2018.01)

(52) U.S. Cl.
CPC ........ *G06F 9/30036* (2013.01); *G06F 9/3012* (2013.01); *G06F 9/30014* (2013.01); *G06F 9/30112* (2013.01); *G06F 9/3887* (2013.01)

(58) Field of Classification Search
CPC .................... G06F 9/30036; G06F 9/3887
See application file for complete search history.

(56) References Cited

U.S. PATENT DOCUMENTS

| 6,233,671 | B1 * | 5/2001 | Abdallah | G06F 9/30014 712/210 |
| 9,329,868 | B2 * | 5/2016 | Bradbury | G06F 9/30141 |
| 2003/0159023 | A1 * | 8/2003 | Barlow | G06F 9/30036 712/241 |
| 2006/0282646 | A1 * | 12/2006 | Dockser | G06F 9/30036 712/4 |
| 2009/0327665 | A1 * | 12/2009 | Sperber | G06F 9/30036 712/222 |
| 2011/0060781 | A1 * | 3/2011 | Iwasa | G06F 9/3001 708/209 |
| 2014/0215189 | A1 * | 7/2014 | Airaud | G06F 9/30014 712/208 |
| 2014/0297994 | A1 * | 10/2014 | Grochowski | G06F 9/30014 712/210 |

FOREIGN PATENT DOCUMENTS

CN         101203830       6/2008

* cited by examiner

*Primary Examiner* — Jacob Petranek

(57) ABSTRACT

A method of implementing a processor architecture and corresponding system includes operands of a first size and a datapath of a second size. The second size is different from the first size. Given a first array of registers and a second array of registers, each register of the first and second arrays being of the second size, selecting a first register and corresponding second register from the first array and the second array, respectively, to perform operations of the first size. Advantageously, this allows a user, who is interfacing with the hardware processor through software, to provide data to the processor agnostic to the size of the registers and datapath bit-width of the processor.

25 Claims, 4 Drawing Sheets

IMPLEMENTING 128-BIT SIMD OPERATIONS ON A 64-BIT DATAPATH

RELATED APPLICATIONS

This application claims the benefit of priority of U.S. Provisional Application No. 62/079,881 filed Nov. 14, 2014, the disclosure of which is incorporated herein by reference in its entirety.

BACKGROUND

Processor specifications can specify datapath parameters to be used. For example, the ARMv8 architecture specifies a datapath that is 128-bits wide for handling 128-bit single instruction, multiple data (SIMD) operations. However, the hardware processor can implement such a datapath in any way that meets the processor specification.

SUMMARY

In an embodiment of the present disclosure, a method of implementing a processor architecture including operands of a first size and a datapath of a second size. The second size is different from the first size. Given a first array of registers and a second array of registers, each register of the first and second arrays being of the second size, selecting a first register and corresponding second register from the first array and the second array, respectively, to perform operations of the first size.

A person of ordinary skill in the art can recognize that the first size and second size can be data sizes, such as bit-width, byte-widths, bit sizes, byte sizes, or any other data size.

In an embodiment, the first array of registers and second array of registers correspond such that each register of the first array corresponds with each register of the second array.

In an embodiment, the first register of the first array, corresponding with the second register of the second array, stores a plurality of bits of a different significance than a plurality of bits stored in the second register.

In an embodiment, the method includes selecting the first register in response to receiving a first non-null select value and selecting the second register in response to receiving a second non-null select value.

In an embodiment, the method includes selecting the first register in response to receiving a first non-null select value and not selecting the second register in the absence of receiving a second non-null select value.

In an embodiment, the method further includes performing a first operation on data of the first register and performing a second operation on data in the corresponding second register at a functional unit, the first operation and second operation related to a same instruction.

In an embodiment, after beginning an operation on data of the first register, the method further includes issuing a stall cycle and reading data of the corresponding second register during the stall cycle.

In an embodiment, the method further includes returning a result of the first size, the result stored partially in a first destination register and partially in a corresponding second destination register in the first array and second array, respectively In an embodiment, the method further includes returning a result of the second size stored in a destination register in either the first array or second array.

In an embodiment, performing operations of the first size includes reading bits of a first operand in the second register in a same clock cycle as bits of a second operand in a first register when the operation is any one of a pairwise instruction and an across-vector instruction. The embodiment further includes reading bits of the first operand in a third register in a next clock cycle as bits of the second operand in a fourth register when the instruction is a pairwise instruction.

In an embodiment, performing operations of the first size includes reading bits of a plurality of registers of the second array in a first clock cycle prior to reading bits of a plurality of registers of the first array in a second clock cycle.

In an embodiment, a system for implementing a processor architecture includes operands of a first size and a datapath of a second size. The second size is different from the first size. The system includes a first array of registers. Each register of the first array is of the second size. The system includes a second array of registers. Each register of the second array is of the second size. The system also includes a selection module configured to select a first register and corresponding second register from the first array and the second array, respectively, to perform operations of the first size.

In an embodiment, the first array of registers and second array of registers correspond such that each register of the first array corresponds with a particular register of the second array.

In an embodiment, the first register of the first array, corresponding with the second register of the second array, stores a plurality of bits of a different significance than a plurality of bits stored in the second register.

In an embodiment, the selection module is further configured to select the first register in response to receiving a first non-null select value and select the second register in response to receiving a second non-null select value.

In an embodiment, the selection module is further configured to select the first register in response to receiving a first non-null select value and to not select the second register in the absence of receiving a second non-null select value.

In an embodiment, the system further includes a functional unit configured to perform a first operation on data of the first register and perform a second operation on data in the corresponding second register at a functional unit, the first operation and second operation related to a same instruction.

In an embodiment, the system further includes an issue unit configured to, after beginning an operation on data of the first register issue a stall cycle and read data of the corresponding second register during the stall cycle.

In an embodiment, the system includes an output module configured to return a result of the first size stored in a first destination register and a corresponding second destination register in the first array and second array, respectively.

In an embodiment, the system further includes an output module configured to return a result of the second size stored in a destination register in either the first array or second array.

In an embodiment, the functional unit is further configured to read bits of a first operand in the second register in a same clock cycle as bits of a second operand in a first register when the operation is any one of a pairwise instruction and an across-vector instruction. The functional unit is still further configured to read bits of the first operand in a third register in a next clock cycle as bits of the second operand in a fourth register when the instruction is a pairwise instruction.

In an embodiment, the functional unit is further configured to read bits of a plurality of registers of the second array in a first clock cycle prior to reading bits of a plurality of registers of the first array in a second clock cycle.

In an embodiment, a non-transitory computer-readable medium has computer-readable program codes embedded thereon including instructions for causing a processor to execute a method for implementing a processor architecture including operands of a first size and a datapath of a second size, the second size being different from the first size. The instructions, when executed by one or more processors, cause the one or more processors to, given a first array of registers and a second array of registers, each register of the first and second array being of the second size, select a first register and corresponding second register from the first array and second array, respectively, to perform operations of the first size.

In an embodiment, the first array of registers and second array of registers correspond such that each register of the first array corresponds with each register of the second array.

In an embodiment, a first register of the first array, corresponding with a second register of the second array, stores a plurality of bits of a different significance than a plurality of bits stored in the second register.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

To be compatible with the ARMv8 architecture, corresponding pairs of the 64-bit registers can be abstracted to appear as 128-bit registers. In the present disclosure, techniques are described to employ 64-bit register files for 128-bit Single instruction, multiple data (SIMD) operations (e.g., for use in an ARM processor). Users of the hardware processor interact with the processor as a 128-bit processor, however, its internal operations uses 64-bit registers. The processor receives 128-bit instructions, and therefore does not require special 64-bit instructions (e.g., it accepts instructions and data of the architecture's bit-width (e.g., 128-bits)). The special techniques described herein automatically separate the datapath into two 64-bit datapaths so that the user is not required to do any further calculation, work, or preparation.

One such technique of implementing 128-bit SIMD operations using 64-bit register files is to read the lower 64 bits of the input operands in one clock cycle, then read the upper 64 bits of the input operands in a subsequent clock cycle. When performing many 128-bit SIMD operations (distinct from a 64-bit operation), an issue unit inserts a stall cycle following the 128-bit SIMD instruction. The stall cycle creates a slot in the instruction pipeline for a functional unit reading the upper 64-bits of the input operands. This empty slot is also available later in the instruction pipeline for returning the upper 64-bits of the result in the clock cycle following the cycle that returned the lower 64-bits of the result. In essence, the issued stall cycle provides a functional unit with an additional clock cycle to calculate the "upper" half of the result and return that result to memory.

Figure 1:
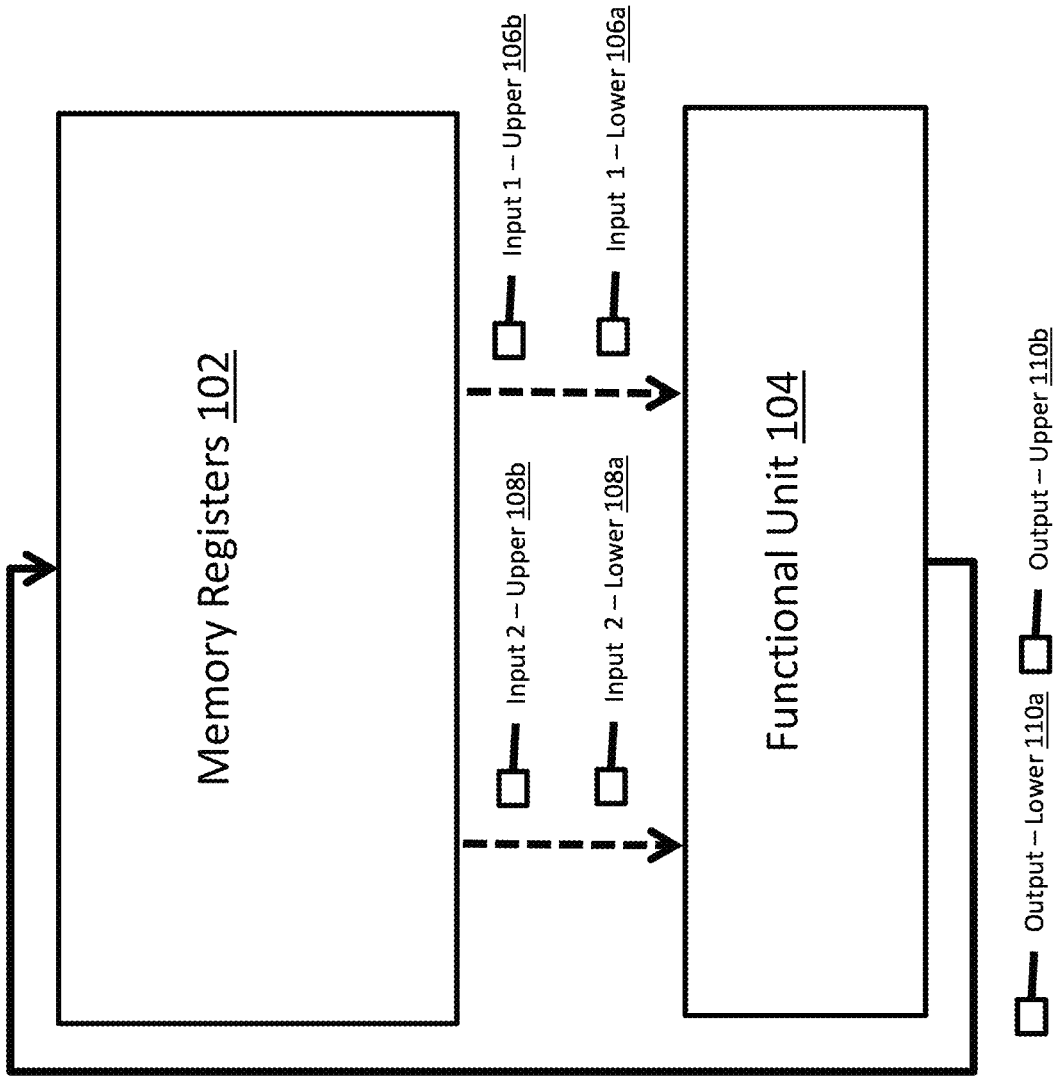
FIG. 1 is a block diagram illustrating an example embodiment of the present disclosure.

FIG. 1 is a block diagram 100 illustrating an example embodiment of the present disclosure. A memory registers unit 102 is operatively coupled to communicate with a functional unit 104 within a processor. The functional unit 104 may be, for example, an arithmetic logic unit (ALU) of the processor.

The memory registers unit 102 stores data of a size of the datapath in two registers—a lower register and an upper register, for each piece of data. Likewise, on a first clock cycle, responding to an instruction for two inputs (e.g., input 1 and input 2), the memory registers 102 outputs Input 1—Lower 106a and Input 2—Lower 108a to the functional unit 104. Then, on a next clock cycle, the memory registers 102 forwards an Input 1—Upper 106b and an Input 2—Upper 108b to the functional unit 104.

The functional unit 104 receives the two inputs 106 and 108 at clock cycles that correspond to the first clock cycle and second clock cycle, but may be delayed based on latency due to pipelining within the processor containing the memory registers unit 102 and functional unit 104. In one example, the functional unit 104 operates on the lower inputs, Input 1—Lower 106a and Input 2—Lower 108a, on a third clock cycle, and then operates on the upper inputs, Input 1—Upper 106b and Input 2 108b, on a fourth clock cycle. However, a person of ordinary skill in the art can recognize that different pipelining architectures can increase or decrease the delay between reading the upper and lower Inputs 1 106 and Inputs 2 108 and performing operations on the same by the functional unit 104.

In the foregoing example, the functional unit 104 performs its function on a third clock cycle. In another example, the functional unit 104 starts working on the lower inputs on a second clock cycle, while the upper inputs are being read from the memory registers unit 102. In still other examples, the functional unit 104 starts working on the lower inputs on some other clock cycle due to pipeline latency.

On this third clock cycle, the functional unit 104 performs its function (e.g., an arithmetic function or other bitwise operation) on the two lower inputs 106a and 108a. In the fourth clock cycle, the functional unit 104 forwards an Output—Lower 110a, representing the result of the operation of the two lower inputs 106a and 108a, to the memory registers 102 to be stored in a destination register designated by the instruction. At the same time, in the fourth clock cycle, the functional unit 104 performs its function on the two upper inputs 106b and 108b. Then, the functional unit 104 forwards an Output—Upper 110b representing the result of the operation of the two upper inputs 106b and 108b, to the memory registers 102 to be stored in a destination register designated by the instruction in a fifth clock cycle.

Therefore, the memory registers 102 store both the Outputs 110a-b in respective lower and upper registers. In this manner, using only registers of one size (e.g., 128-bits), a functional unit receiving inputs and producing outputs of that one size (e.g., 128-bits), the memory registers 102 and functional unit 104 implement a datapath of a second size (e.g., 64-bits) by distributing an operation over more than one clock cycle.

Figure 2:
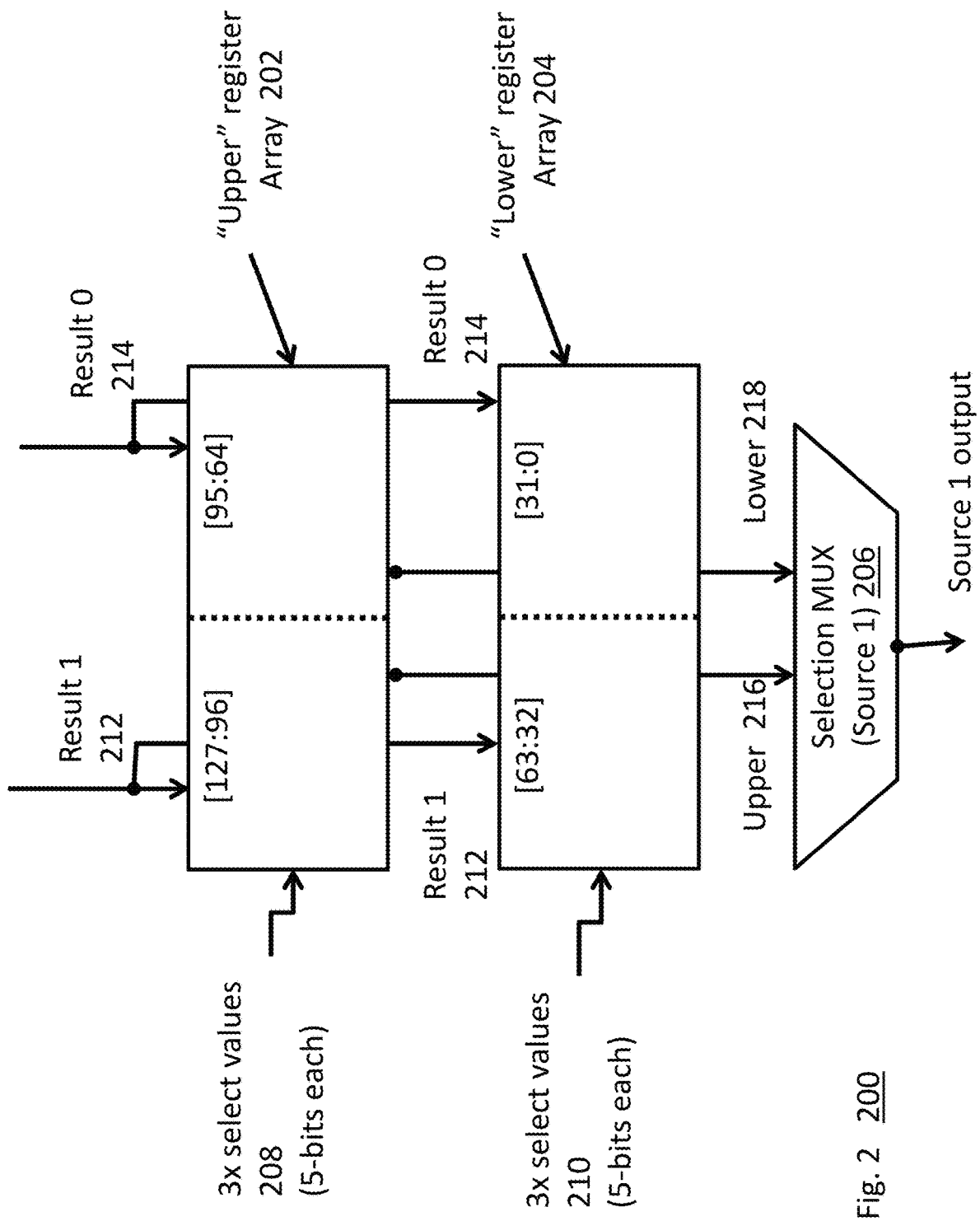
FIG. 2 is a diagram illustrating an example embodiment of the present disclosure.

FIG. 2 is a diagram 200 illustrating an example embodiment of the present disclosure. An upper register array (URA) 202 and lower register array (LRA) 204 each include 32 corresponding 64-bit registers each. In many cases, the registers of the URA 202 and LRA 204 correspond such that, for example, the register 0 of the LRA 204 ("Register L0") corresponds with the register 0 of URA 202 ("Register U0") such that together both registers store a 128-bit value. In this example, Register L0 stores the lower 64-bits and register U0 stores the upper 64-bits of the 128-bit value. A person of ordinary skill in the art can recognize that the upper and lower registers can correspond in different manners and patterns (e.g., via different indexing patterns) several of which are described later in greater detail. A person of ordinary skill in the art can further recognize that some registers in the URA 202 and LRA 204 may not have corresponding registers, for example to store a 64-bit value instead of a 128-bit value. Logically, however, a register storing a 64-bit value, while only using one register, is still considered a 128-bit wide value. A second register may not be used to store the upper half of the value, for example, but the unwritten half still logically exists. In a convenient example, the URA 202 and LRA 204 are located in a single physical array.

Both register arrays URA 202 and LRA 204 are further able to deliver data 32-bits at a time. In this manner, the registers can zero-out 32-bits of data within the 64-bits being stored. This can provide instructions with both 64-bit granularity and 32-bit granularity, if needed. For example, writing values into the register files can be performed in 32-bit increments. Reading values from the register file is performed in 64-bit increments (even if all 64-bits are not used by the functional unit). However, the URA 202 and LRA 204 are both 64-bit registers, even though are modified to provide 32-bit partially zeroed out data.

The URA 202 and LRA 204 are each configured to receive results from a functional unit, such as an ALU, or other module. The URA 202 and LRA 204 are each configured to receive writeback from the functional unit either as Result 1 212 or Result 0 214. The writeback of Result 1 212 and Result 0 214 are 64-bit results.

Each of the URA 202 and LRA 204 is connected to a demultiplexer (not shown) that selects the active register to be written to and a multiplexer (not shown) to select the active register to read from. In an embodiment, the demultiplexer and multiplexer can select multiple registers to respectively write to and read from multiple registers in a same clock cycle. In the embodiment shown, the demultiplexer and multiplexer can select three registers during the same clock cycle, but more or less registers can also be selected (i.e., there are more or less operands selects), in other embodiments. For each selected register, the multiplexer/demultiplexer receives select values 208 and 210 for the URA 202 and LRA 204, respectively, which can be 5-bit values. The select values 208 and 210, in many examples, are the same for a given clock cycle. However, embodiments exist where the select values 208 and 210 are not the same for the same clock cycle. For instance, the select values 208 and 210 can differ in an embodiment where the index of the registers of the URA 202 does not correspond to the index of the registers of the LRA 204.

The URA 202 then outputs three upper values 216 and the LRA 204 outputs three lower values 218 to a selection multiplexer 206. The selection multiplexer 206, based on an input value (select signal), selects whether to send the upper value 216 from the URA 202 or the lower value 218 from the LRA 204 to output to a functional unit. The input value to the selection multiplexer 206 is based on the clock cycle of the processor relative to the instruction received.

The system can further have multiple selection MUXes 206. Each selection MUX 206 can select a different output of the URA 202 and LRA 204 based on a different select signal for each pair of upper and lower inputs. For example, in the embodiment described above in which the URA 202 and LRA 204 produce three respective upper values 216 and lower values 218 each, a respective selection MUX 206 can select between each of the upper values 216 and lower values 218 using the respective select signals. As such, each selection MUX 206 outputs, in aggregate, on consecutive clock cycles, a 128-bit number formed of the respective upper value 216 and lower value 218 received from the respective URA 202 and LRA 204.

In the most common array access sequence, the input value (or select signal) going to the multiplexer 206 is known well enough in advance to influence the select values 208 and 210 feed to the URA 202 and LRA 204, respectively. In a convenient example, if it is known that the multiplexer 206 is going to select operands only from the LRA 204, then the URA 202 receives a special "Null" select value sent from, for example, a controller.

Depending on a number of selects that are active each cycle, an array may receive one or more "Null" select values. For instance, in the example shown in FIG. 2, in which the URA 202 receives three select values, and the URA 202 can receive three "Null" select values. In other examples, instead of receiving the special "Null" value, techniques such as shutting off clocks, not precharging word-lines and bit-lines, or other power-minimization schemes are applied to an array that is not being accessed.

Similarly, if it is known that the multiplexer 206 is going to select operands only from the URA 202, then the LRA 204 receives the special "Null" select value or any one of the techniques mentioned above is applied to the LRA 204. The aforementioned examples are beneficial because in cases in which select values to an array are "Null" (or one of the above-described techniques is used), the array consumes less power than an array with non-"Null" select values. Reducing power is a very important concern in a processor design such as the one being currently described.

Figure 3:
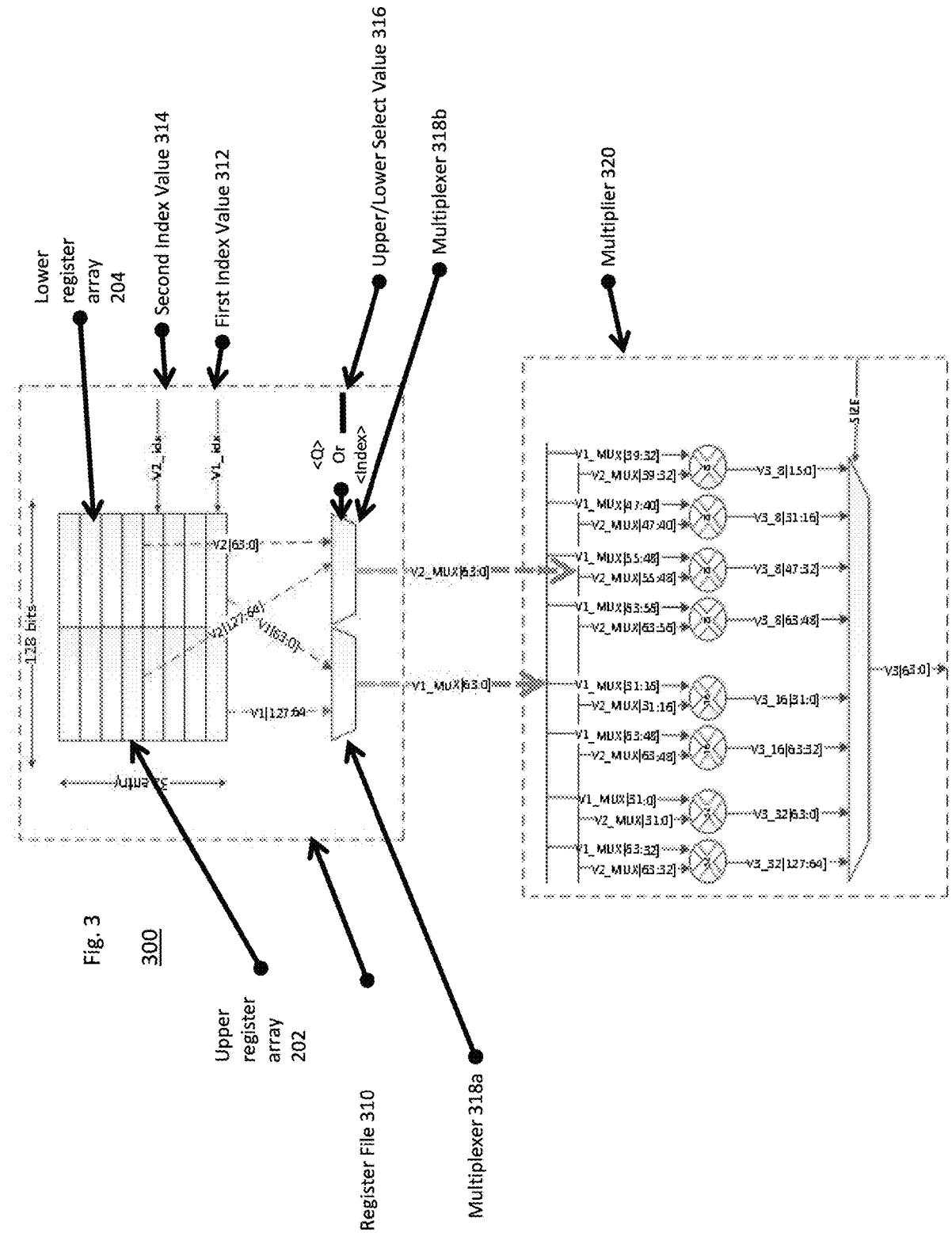
FIG. 3 is a diagram illustrating an example embodiment of a register file operationally coupled with a multiplier.

FIG. 3 is a diagram 300 illustrating an example embodiment of a register file 310 (for example, a floating point unit (FPU) register file or SIMD register file) operationally coupled with a multiplier 320. The multiplier 320 is an example of a functional unit that is configured to operate on two 64-bit operands. (Other functional units may operate on one 64-bit operands or two or more 64-bit operands). The datapath is configured such that the multiplier 320 or functional unit can operate on two upper and lower 64-bit operands in subsequent clock cycles, and the datapath later can piece the two halves of the result together to form a 128-bit result.

The register file 310 includes the URA 202 and LRA 204. The URA 202 and LRA 204 are 64-bits wide, and combined are 128-bits wide. The URA 202 and LRA 204 are arrays with 32 entries. A first index value 312 (V1_idx) selects a first value from the URA 202 and LRA 204 which are outputted as two 64-bit values (V1[63:0] and V1[127:64]) to multiplexer 318a. A second index value 314 selects a second value from the URA 202 and LRA 204, which are outputted as two 64-bit values (V2[63:0] and V2[127:64]) to multiplexer 318b. Each clock cycle, the register file 310 provides 64-bits of two input operands to the multiplier 320. Each clock cycle, the multiplier 320 writes back a result of 64-bits each back into the register file 310.

In an embodiment, a third multiplexer (not shown) can provide a third source value. In such a case, the third multiplexer receives upper and lower values from a third value, and selects the upper or lower value based on the upper/lower select value 316 in the same manner as multiplexers 318*a-b*.

On a first cycle, the multiplexers 318*a-b* receive an upper/lower select value 316. The upper/lower select value 316 determines whether the multiplexers 318*a-b*, and therefore the register file 310, passes on upper or lower values of the register file to the multiplier 320 or other functional unit. In FIG. 3, based on the select value 316, either lower(V1 [63:0], V2[63:0]) or upper values(V1[127:64],V2[127:64]) are MUXed out by the multiplexers 318*a-b* as V1_MUX [63:0] & V2_MUX[63:0].

In a SIMD architecture, multipliers can operate on data of different widths, with the total width of operands being 64 bits. This includes all vector instructions. For example, inputs to the SIMD multiplier 320 can be considered any one of:

Eight 8-bit inputs;
Four 16-bit inputs; and
Two 32-bit inputs;

However, in an embodiment using the SIMD architecture, one 64-bit input is not permitted. Other architectures may permit such an embodiment, however.

To accomplish the varying levels of bit-width granularity provided by the SIMD architecture, the SIMD multiplier 320 employs a plurality of sub-multipliers. In an embodiment, the SIMD multiplier 320 includes of the following multipliers:

Two 32-bit multipliers, each receiving two 32 bit inputs and producing 64-bit outputs;

Two 16-bit multipliers, each receiving two 16-bit inputs and producing 32-bit outputs; and Four 8-bit multipliers, each receiving four 8-bit inputs and producing 16-bit outputs.

For instructions which consider input operands as eight 8-bits operands, the two 32-bit multipliers and two 16-bit multipliers act as four 8-bit multipliers. For instructions which consider input operands as four 16-bits operands, two 32-bit multipliers act as two 16-bit multipliers.

The instruction format can look like the following: "SQDMLAL<Q> <$V_d$>.<$T_a$>, <$V_n$>.<$T_b$>, <$V_m$>.<$T_b$>". The instruction is a "long" instruction, meaning that its output data width is twice as long as its input data width. $V_m$, and $V_n$ are inputs and $V_d$ is the output. $V_m$,$V_n$ are 128-bits wide in total, but only 64-bits are used for any SIMD multiplier instruction for a given clock cycle. Q is a selector that determines whether the upper 64-bits or lower 64-bits of the input should be received. The datapath is 64-bits wide, and all SIMD multiplier instructions should have the same latency regardless of the <Q> specifier. Hence, the correct 64-bits out of the 128 bits need to be sent to the SIMD multiplier in each cycle. This involves a 2:1 MUX in the register file 310 (e.g., multiplexers 318*a-b*) configured to pick between the lower or upper 64-bits of the input, using <Q> as a selection value.

Below are example combinations of this instruction:

| 1. | SQDMLAL  | V3.4S, V2.4H, V1.4H |
|----|----------|---------------------|
| 2. | SQDMLAL  | V3.2D, V2.2S, V1.2S |
| 3. | SQDMLAL2 | V3.4S, V2.4H, V1.4H |
| 4. | SQDMLAL2 | V3.2D, V2.2S, V1.2S |

Instructions 1 and 2, above, operate on the lower 64-bits of V2 & V1, as specified with <Q>. "4H" represents 64-bits of the inputs are to be considered as four 16-bits input, while "4S" represents that the multiplication operation results in four 32-bit outputs.

Instructions 3 and 4, above operate on the upper 64-bits of V2 & V1, as specified with <Q>. In the register file 310, the <Q> selector selects between V1[63:0] & V1[127:64], to form v1_mux, which is 64-bits wide. V1_mux is one of the input operands to the multiplier 320. Similarly, in the register file 310, the <Q> selector selects between V2[63:0] & V2[127:64] to form v2_mux 64 bits wide. V2_Mux is the other input operand to the multiplier 320.

Based on the size of the input operands, corresponding outputs are selected from 32-bit, 16-bit or 8-bit multipliers, for example, by using the SIZE selector to the multiplexer of the multiplier 320.

A person of ordinary skill in the art can recognize that the multiplier 320 can be arranged with different sub-units to achieve different granularities of input and output widths. Further, the multiplier 320 can be any functional unit used in a SIMD architecture that can receive an upper and lower 64-bit input(s) over two clock cycles to form two 64-bit outputs.

A person of ordinary skill in the art can further recognize that the embodiments described herein describe applying the use of 64-bit units and operands to an architecture using 128-bit datapaths. However, the teachings of the present disclosure can be applied to other bit widths. As one non-limiting alternative example, 128-bit units and operands can be applied to an architecture using 256-bit datapaths. As another non-limiting alternative example, 32-bit units and operands can be applied to an architecture using 64-bit datapaths. In yet another example, 64-bit registers can be used to implement a 256-bit datapath by adding in additional 64-bit registers and additional inputs to the multiplexers. However, a person of ordinary skill in the art can envision utilizing the teachings of the present disclosure to implement other bit width combinations.

Figure 4:
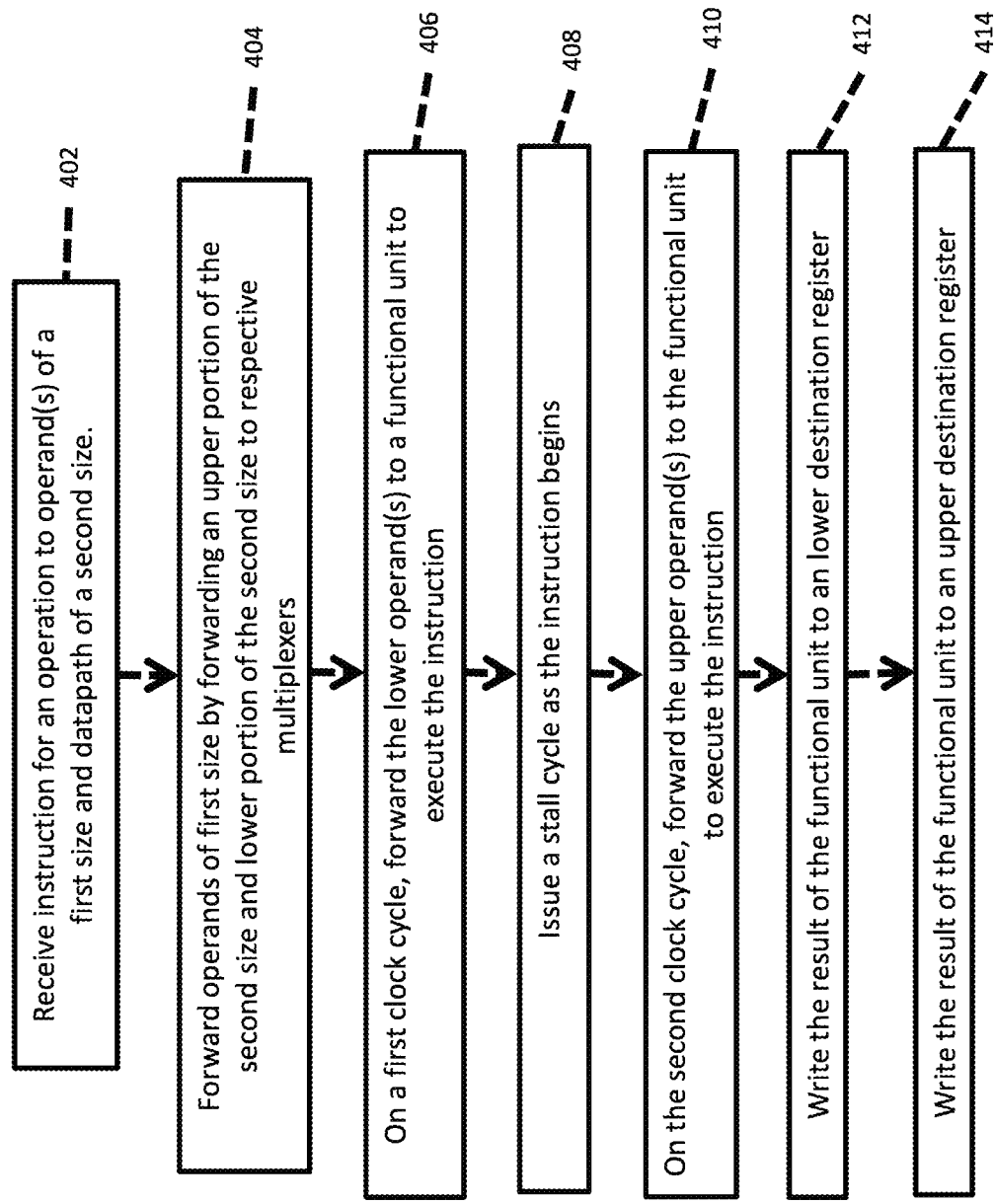
FIG. 4 is a flow diagram illustrating an example embodiment a process employed by the present disclosure.

FIG. 4 is a flow diagram 400 illustrating an example embodiment a process employed by the present disclosure. First, the process receives an instruction for an operation on operand(s) of a first size and datapath of a second size (402). In an embodiment, the size of the operands (first size) is 64-bits and size of the datapath (second size) is 128-bits. The instruction can receive one or more operands, depending on the type of instruction. For example, a multiplication instruction can receive two operands to have both a multiplicand and a multiplier. Other instructions, such as inversion, narrowing, or widening, however, only use one operand, as a second operand is not necessary in these instructions. Other instructions, such as multiply-accumulate, receive three operands.

The process then forwards the operand(s) of the first size by forwarding an upper portion of the second size (e.g., 64-bits) and a lower portion of the second size (e.g., 64-bits) to respective multiplexers (404). In the case of an instruction having two operands, two multiplexers receive upper and lower portions for each operand. In the case of an instruction having one operand, one multiplexer receives the upper and lower portion for the single operand.

The process then, on a first clock cycle, forwards the lower operand(s) from the functional unit to execute the instruction for the lower bits (406). However, in certain special cases, upper operands may be forwarded to the functional unit first. The select bit of the respective multiplexers is determined based on the instruction and the clock cycle. The process also issues a stall cycle from an issue unit (408). The stall cycle is issued as the instruction begins to allow the functional unit an extra clock cycle to process the second 64-bit calculation.

The process then, on the second clock cycle, forwards the upper operand(s) to the functional unit to execute the instruction for the upper bits of the operand (410). As described above, however, if the functional unit first received the upper operand(s), in the second clock cycle the functional unit instead receives the lower operand(s). The functional unit, as it is calculating the partial result of the upper operands, writes the result of the lower operands to a lower destination register (412). Then, after finishing the partial result of the upper operands, it writes the upper result to an upper destination register (414). Based on the delay in the processor's pipeline, the functional unit can operate on the operands and then subsequently writeback of the lower and upper results on clock cycles after having read from the memory registers. The delay can vary in different embodiments. In one example, the delay is two cycles after the initial reading of memory.

The process, therefore, utilizes, in one embodiment, 64-bit registers and functional units to implement a 128-bit datapath. Further, at levels of abstraction, such as a user interfacing with the hardware processor through software, for example, the user interacts by providing data of the datapath bit-width instead of the register bit-width. In this manner, the user is agnostic to the size of the registers.

Other examples of the process may be described by more or fewer process blocks. For examples, in a convenient example of the process, process block 408, in which a stall cycle is issued, and process block 410, in which an instruction is executed, may be combined. In this example, the act of issuing the stall cycle and executing the instruction occur in the same cycle. Another example of the process includes a process block between process blocks 410 and 412 describing the acts of the functional unit 104 as discussed above with reference to FIG. 1.

The above-described technique is effective for many operations, however some operands/instructions, described below, have exceptions. For example, a narrowing instruction operates on two 128-bit operands and returns a result that is only 64-bits. For example the ADDHN{2} instructions can receive two 128-bit operands and return only a 64-bit result. A "non-'2'" version of the instruction writes the result into a lower register array; while a "2" version of the instruction writes the result into an upper register array.

In other cases, some instructions can require reading the upper 64-bits of one or more input operands in a first clock cycle. For example, a multiplier can first read the upper 64-bits of its operands.

Certain "by-element" instructions can apply a single element operand across all lanes in a calculation. For example, the instruction SQDMLAL<Q> <$V_d$>.<$T_a$>, <$V_n$>.<$T_b$>, <$V_m$>.<$T_s$>[<index>] is a multiply by element instruction. The Index bit field determines where the element resides within $V_m$ (one of the operands to the multiplier). Instead of <Q> selecting the upper vs lower half for one of the operands, which in this case is $V_m$, the Index bit field determines whether to grab the element from lower or the upper half. This element then gets replicated on all lanes within the multiplier.

Certain "widening" and "long" instructions may read only the lower 64-bits or only the upper-64 bits of some operands, and yet still write 128-bit results. In this case, only one cycle is needed for reading one 64-bit register. Then, a lower 64-bit result and upper 64-bit result are written back to corresponding registers in subsequent clock cycles. An issue unit issues a stall cycle to allow the functional unit to write back both 64-bit results to the registers. In a widening instruction, the elements in a first operand are half the size of the elements in a second operand and the result. Instructions are configured to read only the lower portion of the first, smaller-size, operand and only the upper portion of the smaller-size operand in the '2' flavor.

Certain load and store operations require reading only the upper 64-bits of an input operand. For example, loading and storing data in big-endian mode have another layer of complexity as well. Consider an instruction "STR <Qt>, [<Xn|SP>], #<simm>." This instruction stores the content of <Qt> which is 128-bits wide from the register file (e.g., register file 310 of FIG. 3) into an external memory location (not shown), as defined by <Xn> or <SP>. Data in the external memory could be stored in either big endian or little endian format. The content in the register file is generally stored in little endian format. For big endian stores, the contents in <Qt> are flipped at the 64 bit boundary. Hence the lower 64-bits and the upper 64-bits are swapped while reading out of the register file. The flipped data is then stored into the external memory location as defined by <Xn> or <SP>.

In some cases, both the lower and upper 64 bits of one input operand are read in the first cycle. For example, certain "pairwise" or "across-vector" instructions require both halves of a single operand in the same clock cycle. However, in some of these cases, both the lower and upper 64-bits of a second input operand can be read in a second clock cycle.

In the present disclosure, instruction decoding has to quickly specify the particular sequence of operand accesses, and define how the result is written back into the register file.

There are also implications in datapath elements when some state must be preserved across the two cycles of a 128-bit operation. For some 128 bit instructions like ZIP, TRN, EXT, UZP, the data from the memory is received over two clock cycles; the lower half is received in clock cycle 1 and the upper half is received in clock cycle 2. Depending on the instruction, certain elements from both data halves are selected. This requires preserving the lower half of data in the second cycle. Also, in general, all 128-bit instructions execute over 2 cycles, because the issue unit issues the instruction on cycle 1 and a stall on cycle 2, the instruction itself needs to be preserved on the second cycle. The functional unit on the first cycle decodes whether the instruction is meant for it, if necessary preserves the instruction for the second cycle.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of implementing a processor architecture, the method comprising:
provisioning the processor with operands of a first size and a datapath of a second size that is different than the first size; and
given a first array of registers and a second array of registers, each register of the first array and the second array being of the second size and comprised in a register file, selecting, by at least one multiplexer comprised in the register file, in response to receiving select values, one of a first register and a second register from the first array and the second array, respectively, to perform operations of the first size on the datapath of the second size, wherein the first register and the second register correspond to each other, and wherein the selecting the one of the first register and the second register is based on a clock cycle of the processor relative to an instruction received.

2. The method of claim 1, wherein each register of the first array corresponds with a particular register of the second array, and wherein bits stored in the first register of the first array and bits stored in the corresponding second register of the second array represent an operand, of the operands, of the first size.

3. The method of claim 2, wherein the first register of the first array, corresponding with the second register of the second array, stores a plurality of bits of a different significance than a plurality of bits stored in the second register of the second array.

4. The method of claim 1, wherein the selecting the one of the first register and the second register includes selecting the first register in response to receiving a first non-null select value of the select values, and selecting the second register in response to receiving a second non-null select value of the select values.

5. The method of claim 1, wherein the selecting the one of the first register and the second register includes selecting the first register in response to receiving a first non-null select value of the select values, and not selecting the second register in absence of receiving a second non-null select value of the select values.

6. The method of claim 1, further comprising:
performing a first operation, of the operations, on data of the first register and performing a second operation, of the operations, on data of the corresponding second register at a functional unit, wherein the first operation and the second operation are related to a same instruction.

7. The method of claim 1, further comprising:
after beginning an operation, of the operations, on data of the first register:
issuing a stall cycle; and
reading data of the corresponding second register during the stall cycle.

8. The method of claim 1, further comprising:
returning a result of the first size, wherein the result is stored partially in a first destination register and partially in a corresponding second destination register in the first array and the second array, respectively.

9. The method of claim 1, further comprising:
returning a result of the second size stored in a destination register in either the first array or the second array.

10. The method of claim 6, wherein the performing the operations of the first size includes reading bits of a first operand, of the operands, in the second register in a same clock cycle as bits of a second operand, of the operands, in the first register when the instruction is any one of a pairwise instruction and an across-vector instruction, and further includes reading bits of the first operand in a third register, of the second array, in a next clock cycle as bits of the second operand in a fourth register, of the first array, when the instruction is a pairwise instruction.

11. The method of claim 6, wherein the performing the operations of the first size includes reading bits of a plurality of registers of the second array in a first clock cycle prior to reading bits of a plurality of registers of the first array in a second clock cycle.

12. A system for implementing a processor architecture, the system comprising:
operands of a first size and a datapath of a second size that is different than the first size: and
a register file, wherein the register file comprises:
a first array of registers, each register of the first array being of the second size;
a second array of registers, each register of the second array being of the second size; and
at least one multiplexer configured to select, in response to reception of select values, one of a first register and a second register from the first array and the second array, respectively, to perform operations of the first size on the datapath of the second size, wherein the first register and the second register correspond to each other, and wherein the at least one multiplexer is configured to select the one of the first register and the second register based on a clock cycle of the processor relative to an instruction received.

13. The system of claim 12, wherein each register of the first array corresponds with a particular register of the second array, and wherein bits stored in the first register of the first array and bits stored in the corresponding second register of the second array represent an operand, of the operands, of the first size.

14. The system of claim 13, wherein the first register of the first array, corresponding with the second register of the second array, stores a plurality of bits of a different significance than a plurality of bits stored in the second register of the second array.

15. The system of claim 12, wherein the at least one multiplexer is configured to select the first register in response to reception of a first non-null select value of the select values, and select the second register in response to reception of a second non-null select value of the select values.

16. The system of claim 12, wherein the at least one multiplexer is configured to select the first register in response to reception of a first non-null select value of the select values and to not select the second register in absence of reception of a second non-null select value of the select values.

17. The system of claim 12, further comprising:
a functional unit configured to perform a first operation, of the operations, on data of the first register and perform a second operation, of the operations, on data of the corresponding second register, wherein the first operation and the second operation are related to a same instruction.

18. The system of claim 12, further comprising:
an issue unit configured to, after beginning an operation, of the operations, on data of the first register:
issue a stall cycle; and
read data of the corresponding second register during the stall cycle.

19. The system of claim 12, further comprising:
an output module configured to return a result of the first size, wherein the result is stored partially in a first destination register and partially in a corresponding second destination register in the first array and the second array, respectively.

20. The system of claim 12, further comprising:
an output module configured to return a result of the second size stored in a destination register in either the first array or the second array.

21. The system of claim 17, wherein the functional unit is further configured to read bits of a first operand, of the operands, in the second register in a same clock cycle as bits of a second operand, of the operands, in the first register based on an operation, of the operations, being based on at least one of a pairwise instruction and an across-vector instruction, and to read bits of the first operand in a third register, of the second array, in a next clock cycle as bits of the second operand in a fourth register, of the first array, when the instruction is a pairwise instruction.

22. The system of claim 17, wherein the functional unit is further configured to read bits of a plurality of registers of the second array in a first clock cycle prior to reading bits of a plurality of registers of the first array in a second clock cycle.

23. A non-transitory computer-readable medium having computer-readable program codes embedded thereon including instructions, for implementing a processor architecture that, when executed by the processor, cause the processor to:

provision operands of a first size and a datapath of a second size that is different than the first size; and given a first array of registers and a second array of registers, each register of the first array and the second array being of the second size and comprised in a register file, select, by at least one multiplexer comprised in the register file, in response to reception of select values, one of a first register and a second register from the first array and the second array, respectively, to perform operations of the first size on the datapath of the second size, wherein the first register and the second register correspond to each other, and wherein the selection of the one of the first register and the second register is based on a clock cycle of the processor relative to an instruction received.

24. The non-transitory computer-readable medium of claim 23, wherein each register of the first array corresponds with a particular register of the second array, and wherein bits stored in the first register of the first array and bits stored in the corresponding second register of the second array represent an operand, of the operands, of the first size.

25. The non-transitory computer-readable medium of claim 24, wherein the first register of the first array, corresponding with the second register of the second array, stores a plurality of bits of a different significance than a plurality of bits stored in the second register of the second array.

* * * * *